United States Patent
Stoller (10) Patent No.: US 9,329,302 B2
(45) Date of Patent: May 3, 2016

(54) USE OF SPECTRAL INFORMATION TO EXTEND TEMPERATURE RANGE OF GAMMA-RAY DETECTOR

(71) Applicant: Christian Stoller, Princeton Junction, NJ (US)

(72) Inventor: Christian Stoller, Princeton Junction, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 517 days.

(21) Appl. No.: 13/629,268

(22) Filed: Sep. 27, 2012

(65) Prior Publication Data

US 2014/0084149 A1    Mar. 27, 2014

(51) Int. Cl.
| | |
|---|---|
| *G01V 5/06* | (2006.01) |
| *G01T 1/36* | (2006.01) |
| *G01T 1/20* | (2006.01) |
| *G01V 5/04* | (2006.01) |

(52) U.S. Cl.
CPC ... *G01V 5/06* (2013.01); *G01T 1/20* (2013.01); *G01T 1/362* (2013.01); *G01V 5/04* (2013.01)

(58) Field of Classification Search
CPC ............. G01V 5/02; G01V 5/08; G01V 5/12; G01V 5/125; G01V 5/14; G01V 5/145; G01V 5/107; G01V 5/00
USPC ......................................................... 250/261
See application file for complete search history.

(56) References Cited

U.S. PATENT DOCUMENTS

| | | | | |
|---|---|---|---|---|
| 3,780,301 | A * | 12/1973 | Smith et al. ................... 250/301 |
| 3,829,686 | A * | 8/1974 | Schultz et al. ................ 376/165 |
| 3,922,541 | A * | 11/1975 | Seeman ........................ 250/256 |
| 3,939,343 | A * | 2/1976 | Schultz .................. G01V 5/102 250/269.6 |
| 3,940,610 | A * | 2/1976 | Dennis ..................... E21B 49/00 250/253 |
| 4,002,903 | A * | 1/1977 | Pitts et al. ...................... 376/165 |
| 4,053,767 | A * | 10/1977 | Kampfer et al. ........... 250/252.1 |
| 4,055,763 | A * | 10/1977 | Antkiw .................. G01V 5/102 250/252.1 |
| 4,271,356 | A * | 6/1981 | Groeschel ............... G01V 5/06 250/253 |
| 4,300,043 | A * | 11/1981 | Robbins ........................ 250/262 |
| 4,899,054 | A * | 2/1990 | Barfod .......................... 250/369 |

(Continued)

FOREIGN PATENT DOCUMENTS

| | | |
|---|---|---|
| EP | 775922 A2 | 5/1997 |
| RU | 2191413 C1 | 10/2002 |
| WO | 2012058440 A1 | 5/2012 |

OTHER PUBLICATIONS

Ellis, et al., "Well Logging for Earth Scientists, Chapter 11", 2nd Edition, Springer, 2007, pp. 267-288.

(Continued)

*Primary Examiner* — Marcus Taningco
*Assistant Examiner* — Djura Malevic
(74) *Attorney, Agent, or Firm* — Michael Dae (57) ABSTRACT

A method is for detecting gamma rays using a gamma ray detector, and includes determining a first count of gamma rays having an energy in a first energy interval, using a controller coupled to the gamma ray detector. A second count of gamma rays having an energy in a second energy interval is determined, the second energy interval having a higher energy than the first energy interval, using the controller. A third count of gamma rays having an energy in a third energy interval is determined, the third energy interval having a higher energy than the second energy interval, using the controller. The second count of gamma rays is compensated for noise based upon a ratio of the second count and the third count, using the controller.

27 Claims, 7 Drawing Sheets

(56) References Cited

U.S. PATENT DOCUMENTS

| | | | | |
|---|---|---|---|---|
| 4,926,044 | A | * | 5/1990 | Wraight .................. G01V 5/102 250/264 |
| 5,227,968 | A | * | 7/1993 | Ichihara ........................ 378/87 |
| 5,360,975 | A | * | 11/1994 | Stoller ......................... 250/262 |
| 5,371,672 | A | * | 12/1994 | Motomura et al. ........... 600/431 |
| 5,420,422 | A | * | 5/1995 | Loomis .................. G01V 5/107 250/269.1 |
| 5,434,414 | A | * | 7/1995 | Berlad et al. .............. 250/363.07 |
| 5,438,202 | A | * | 8/1995 | Matanzon et al. ........ 250/363.07 |
| 5,459,314 | A | * | 10/1995 | Plasek ......................... 250/269.7 |
| 5,475,727 | A | * | 12/1995 | Buchanan .................. G01T 1/40 378/53 |
| 5,633,499 | A | * | 5/1997 | Lim et al. .................. 250/363.07 |
| 5,633,500 | A | * | 5/1997 | Morgan et al. ............ 250/363.07 |
| 6,051,830 | A | * | 4/2000 | Moake ........................ 250/252.1 |
| 6,175,118 | B1 | * | 1/2001 | Takayama et al. ............. 250/369 |
| 6,177,675 | B1 | * | 1/2001 | Gagnon et al. .............. 250/363.1 |
| 6,369,389 | B1 | * | 4/2002 | Berlad et al. .............. 250/363.07 |
| 7,081,616 | B2 | * | 7/2006 | Grau ....................... G01V 5/101 250/253 |
| 7,202,456 | B2 | * | 4/2007 | Mickael ........................ 250/200 |
| 7,253,401 | B2 | * | 8/2007 | Mickael .................. G01V 5/06 250/252.1 |
| 7,361,886 | B2 | * | 4/2008 | Stoller et al. ............... 250/269.1 |
| 7,446,308 | B2 | | 11/2008 | Gilchrist et al. |
| 7,449,680 | B2 | * | 11/2008 | Wang et al. ................ 250/252.1 |
| 7,456,405 | B1 | * | 11/2008 | Iwatschenko-Borho G01T 1/023 250/339.02 |
| 7,504,635 | B2 | * | 3/2009 | Ramsden ...................... 250/369 |
| 7,800,052 | B2 | * | 9/2010 | Gadot .......................... 250/261 |
| 8,173,953 | B2 | * | 5/2012 | Stoller et al. ................. 250/262 |
| 8,530,827 | B2 | * | 9/2013 | Duraj ........................... 250/262 |
| 8,866,092 | B2 | * | 10/2014 | Duraj et al. .................... 250/369 |
| 8,907,270 | B2 | * | 12/2014 | Beekman .................. G01T 1/40 250/269.6 |
| 8,946,648 | B2 | * | 2/2015 | Nelson .......................... 250/395 |
| 2003/0047686 | A1 | | 3/2003 | Fries et al. |
| 2004/0264628 | A1 | * | 12/2004 | Besson .................. A61B 6/508 378/5 |
| 2005/0127282 | A1 | * | 6/2005 | Grau et al. ..................... 250/262 |
| 2008/0251709 | A1 | * | 10/2008 | Cooke et al. ............... 250/252.1 |
| 2010/0243877 | A1 | * | 9/2010 | Berheide et al. ........... 250/252.1 |
| 2010/0301198 | A1 | * | 12/2010 | Berheide et al. ........... 250/252.1 |
| 2013/0134304 | A1 | * | 5/2013 | Beekman .................. G01T 1/40 250/269.6 |

OTHER PUBLICATIONS

International Preliminary Report on Patentability issued in application PCT/US2013/062287 on Mar. 31, 2015, 11 pages.

* cited by examiner

USE OF SPECTRAL INFORMATION TO EXTEND TEMPERATURE RANGE OF GAMMA-RAY DETECTOR

FIELD OF THE DISCLOSURE

This disclosure relates to the counting of gamma rays in a borehole, and, more particularly, to the accurate counting of such gamma rays at high temperature.

BACKGROUND

The measurement of natural gamma rays (NGR) in oil well logging dates back to the late 1930s and is the oldest known nuclear well log measurement. In the early days of NGR logging, the NGR measurement was typically performed using Geiger-Müller (GM) tubes. While these tubes are robust and work at high temperatures, they exhibit poor sensitivity to gamma-rays and, thus, today, they are rarely used in logging. The GM tube was replaced in the 1960s and 70s by scintillation detectors comprising a scintillation crystal, which is typically NaI, coupled to a photomultiplier tube (PMT). NaI detectors show a large increase in gamma-ray sensitivity compared to GM-tubes and allow spectral measurements.

Over the last decade, there has been a renewed push to make downhole logging tools work at higher temperatures, for example above 175° C. Such high temperatures pose issues for many sensors and their associated electronics currently used by downhole logging tools. For example, the scintillators mentioned above have drawbacks at high temperatures. For a NaI scintillation detector, the light output, i.e. the number of scintillation photons per unit of deposited gamma-ray energy, drops as the temperature increases. At the same time, the quantum efficiency of the PMT's photocathode, i.e. the fractional number of electrons emitted per photon entering the photomultiplier, drops. Additionally, the noise (dark current) of the PMT increases. This makes it increasingly difficult to distinguish noise from real events as the temperature goes up.

Despite these drawbacks with scintillation detectors, their sensitivity makes them useful. As such, new methods of addressing these drawbacks are desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Described herein is a method of detecting gamma rays using a gamma ray detector. The method may include determining a first count of gamma rays having an energy in a first energy interval, using a controller coupled to the gamma ray detector, and then determining a second count of gamma rays having an energy in a second energy interval, the second energy interval having a higher energy than the first energy interval, using the controller. The method may also include determining a third count of gamma rays having an energy in a third energy interval, the third energy interval having a higher energy than the second energy interval, using the controller, and compensating the second count of gamma rays for noise based upon a ratio of the second count and the third count, using the controller.

According to another aspect, a method is for measuring a spectrum of gamma rays in a borehole. The method may include detecting a gamma ray spectrum using a gamma ray detector positioned in the borehole, and determining a first count of gamma rays having an energy in a first energy interval, using a controller coupled to the gamma ray detector. The method may also include determining a second count of gamma rays having an energy in a second energy interval, the second energy interval having a higher energy than the first energy interval, using the controller, and determining a third count of gamma rays having an energy in a third energy interval, the third energy interval having a higher energy than the second energy interval, using the controller. The method may further include adjusting a system gain such that a ratio of the second count and the third count is constant in an absence of noise in the first energy interval, and detecting noise in the first energy interval based upon a ratio of the first count to the second count exceeding a given ratio, and ceasing system gain adjustment based thereupon.

According to a further aspect, a method is for detecting gamma rays using a gamma ray detector. The method may include determining an absence of noise in a first energy interval, using a controller coupled to the gamma ray detector, and in an absence of noise in the first energy interval, determining a second noise free count of gamma rays having an energy in a second energy interval, the second energy interval having a higher energy than the first energy interval, using the controller. In addition, in the absence of noise in the first energy interval, the method may include determining a third noise free count of gamma rays having an energy in a third energy interval, the third energy interval having a higher energy than the second energy interval, using the controller. The method may also include determining a presence of noise in the first energy interval, using the controller, and in a presence of noise in the first energy interval, determining a second count of gamma rays having an energy in the second energy interval, using the controller, where the second count may be affected by noise. Also, in the presence of noise in the first energy interval, the method may include determining a third count of gamma rays having an energy in the third energy interval, using the controller, where the third count is assumed not to be affected by noise. The second noisy count may be compensated for noise in the second energy interval based upon a ratio of the second noise free count to the third noise free count, and based upon the third count.

A device aspect is directed to a radiation detection system. The radiation detection system may include a radiation detector, and a controller coupled to the radiation detector. The controller may be configured to determine a first count of radiation having an energy in a first energy interval, and to determine a second count of radiation having an energy in a second energy interval, the second energy interval having a higher energy than the first energy interval. The controller may be further configured to determine a third count of radiation having an energy in a third energy interval, the third energy interval having a higher energy than the second energy interval, and may compensate the second count of radiation for noise based upon a ratio of the second count and the third count.

DETAILED DESCRIPTION

One or more embodiments of the present disclosure will be described below. These described embodiments are only examples of the presently disclosed techniques. Additionally, in an effort to provide a concise description, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

This disclosure presents a method to improve the high temperature response of a scintillation detector based gamma ray detector through the use of spectral information. This complements improvements in photomultiplier tubes (PMTs) or other photon detectors and improvements to scintillation detectors through better packaging or the choice of alternative materials. A gain regulation scheme disclosed herein is used for gross counting natural gamma ray detectors and improves their usability at high temperature. The same approach can be used for spectroscopy detectors, whether it be for the detection of natural gamma rays, neutron induced gamma rays, or for scintillator-based neutron or neutron-gamma detectors. While the methods disclosed herein are particularly useful in a high temperature environment, they can be used not only in logging applications but in surface applications, and indeed applications outside of the oilfield, involving the detection of gamma rays and or neutrons using scintillators.

Figure 1:
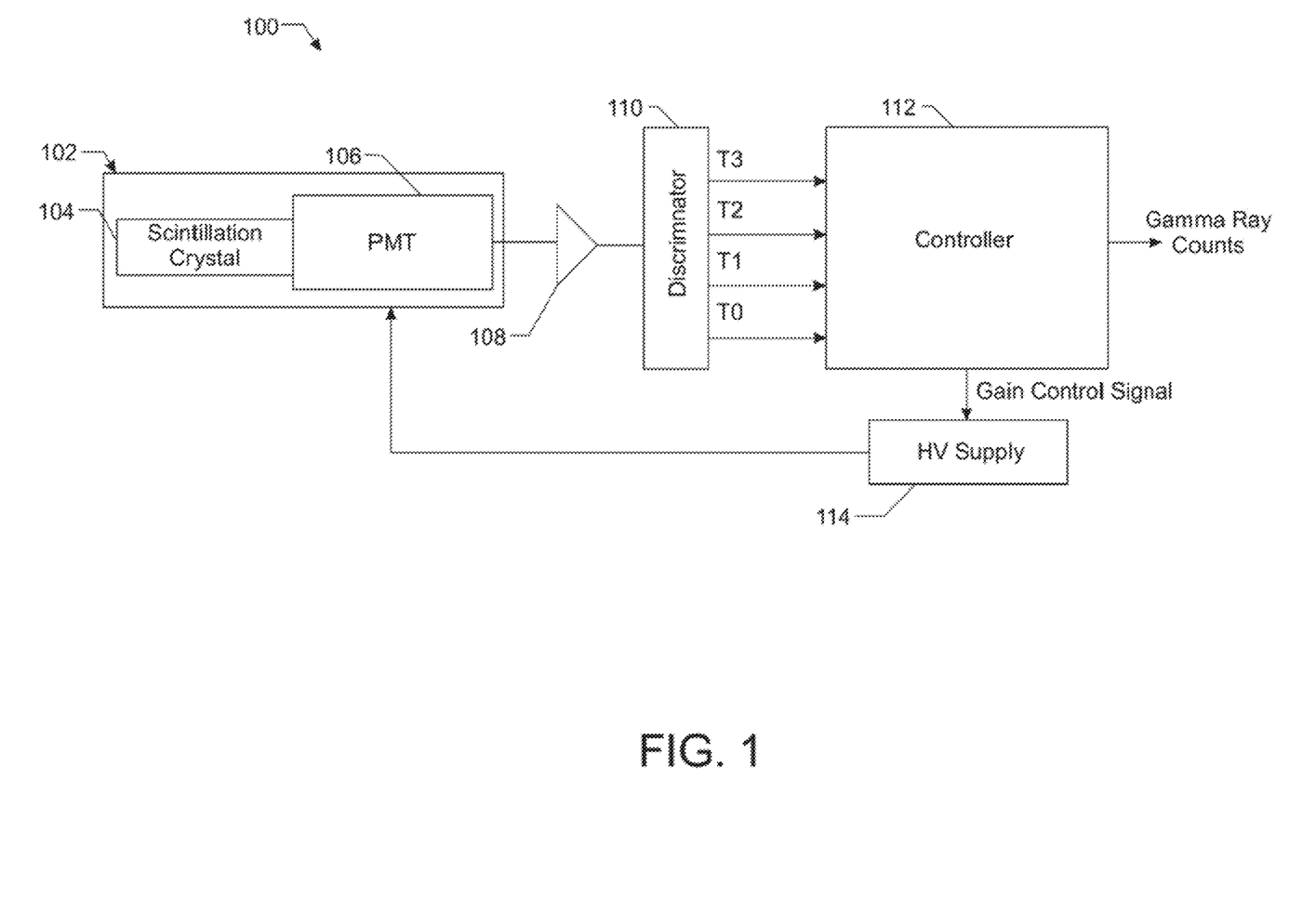
FIG. 1 is a schematic block diagram of a radiation detection system in accordance with the present disclosure.

With reference initially to FIG. 1, a radiation detection system 100 is now described. For clarity and to illustrate an embodiment, the radiation detection system 100 will be described and referred to herein as a gamma ray detection system, but it should be readily understood by those of skill in the art that it could be any sort of radiation detection system, such as a neutron or x-ray detection system.

The radiation detection system 100, referred to hereinafter as the gamma ray detection system, includes a detector 102, for example a gamma ray detector. The detector 102 comprises a scintillator 104, which is illustratively a scintillation crystal but may be any suitable scintillator and is not limited to crystal scintillators, optically coupled to a PMT 106. During operation, the scintillation crystal 104 scintillates (emits light) based upon radiation such as a gamma ray impinging thereon. The PMT 104 detects these scintillations and converts them to the electrical domain. The detector 102 is coupled to an optional amplifier 108 that amplifies the output of the PMT, which is in turn coupled to a 4-channel discriminator 110.

The discriminator 110 provides an output pulse on a given channel based upon the largest of which of its preset thresholds the input signal exceeds. Here, the discriminator 110 has four thresholds: T0, T1, T2, and T3. For example, if an input signal exceeds the T0, T1 and T2 thresholds, but not T3, the discriminator 110 will output a pulse on the T0, T1 and T2 output channels; likewise, if an input signal exceeds the T0, T1, T2, and T3 thresholds, the discriminator will output a pulse on the T0, T1, T2 and T3 output channels.

The discriminator 110 outputs are coupled to a controller 112, which, as will be explained below, processes the input it receives from the discriminator, and, based upon that input, modifies the gain of the gamma ray detection system 100 via the high voltage (HV) power supply coupled between the controller and the detector 102. Before discussing the details of the gain regulation scheme of this disclosure, first the basics of gain regulation in radiation detection systems will be discussed.

Figure 2:
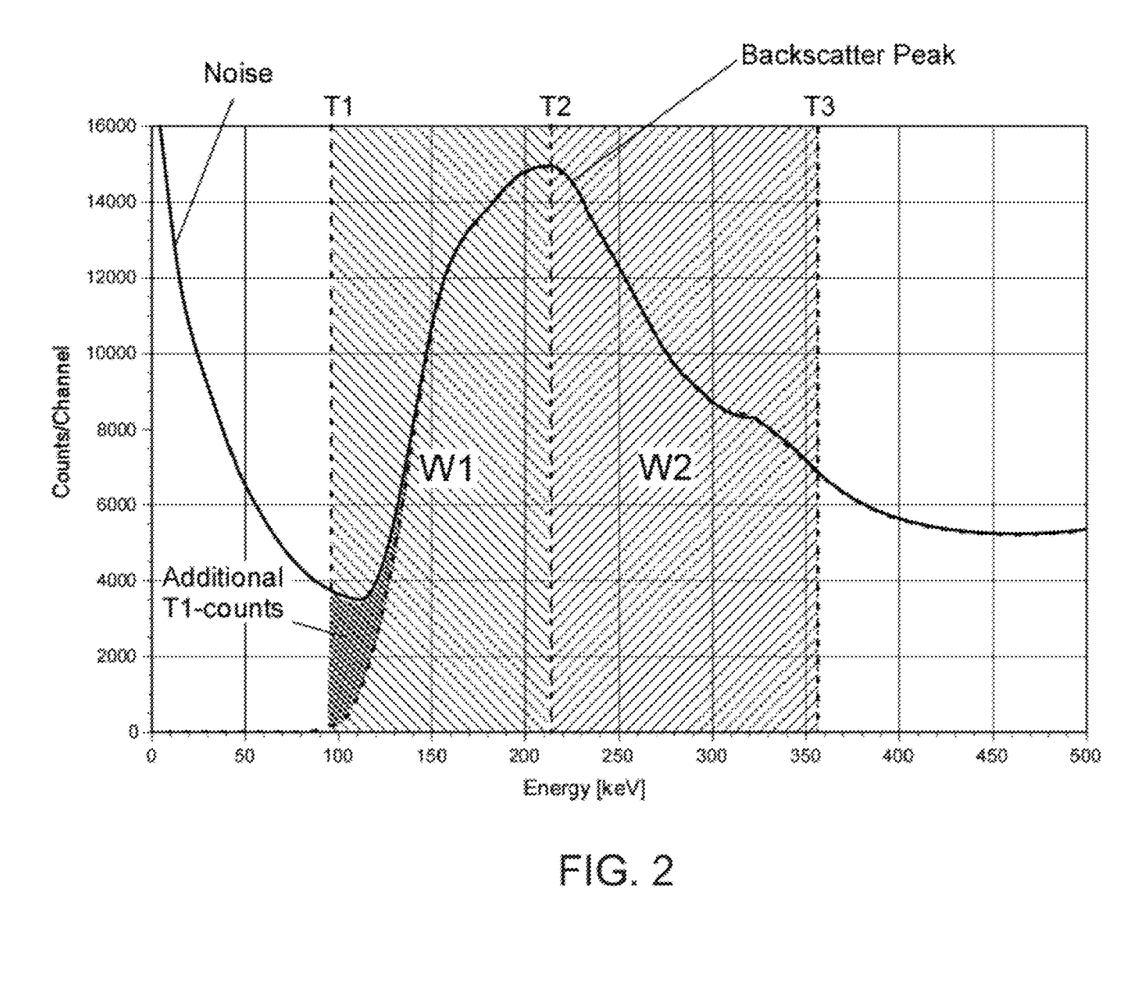
FIG. 2 is a graph of energy vs. counts illustrating noise entering energy thresholds used by prior radiation detection systems for gain regulation.

Shown in FIG. 2 is an example graph showing the number of counts detected by a typical gamma ray detector during a logging operation versus the energy of those counts. This graph has three thresholds, T1, T2, and T3. A count is attributed to all the thresholds triggered by the input signal, as explained above. The difference between the T2 counts and the T1 counts represents the counts contained between the two thresholds, and defines a count W1 in a first window or energy interval W1. Similarly, the difference between the T3 counts and the T2 counts represents the counts contained between those two thresholds, and defines a second window or energy interval W2. The energy intervals W1 and W2 straddle the backscatter peak. The backscatter peak is used as the reference peak for gain regulation as its shape is minimally affected by changes in the total spectrum. Gain regulation may be performed by continuously setting the gain such that the ratio between the W1 counts and the W2 counts is equal to a desired value. Depending upon the error function used in the gain regulation, the desired value may be 1 or 0, for example. Such a gain regulation scheme works well in the absence of noise. However, in the presence of noise, this gain regulation scheme breaks down.

At high temperatures, some detectors output less light for a given number of radiation counts. At the same time, at such high temperatures, the quantum efficiency (electrons emitted per incident photon) of the photocathode in the PMTs tends to decrease, while the thermionic emission (dark current) in the PMT goes up. The latter increases exponentially with the absolute temperature of the photocathode and its surrounding area. The increased dark current results in noise pulses at the output of the PMT, which, once they achieve sufficient amplitude, will cross the threshold T1. This creates an imbalance between the W1 and W2, and serves to destabilize the gain control—the noise pulses will be measured as counts, and cause the gain control to increase the gain since the increase in W1 counts is interpreted as being due to a low gain. The increased gain then exacerbates the problem, as even more noise pulses will cross T1, in turn causing the gain control to increase the gain yet again. Such a situation is shown in FIG. 2 where, due to noise, additional T1 counts (due to noise, and not due to gamma rays) are detected. This results in, as explained, destabilization of the gain control, as well as false T1 counts being recorded.

Figure 3:
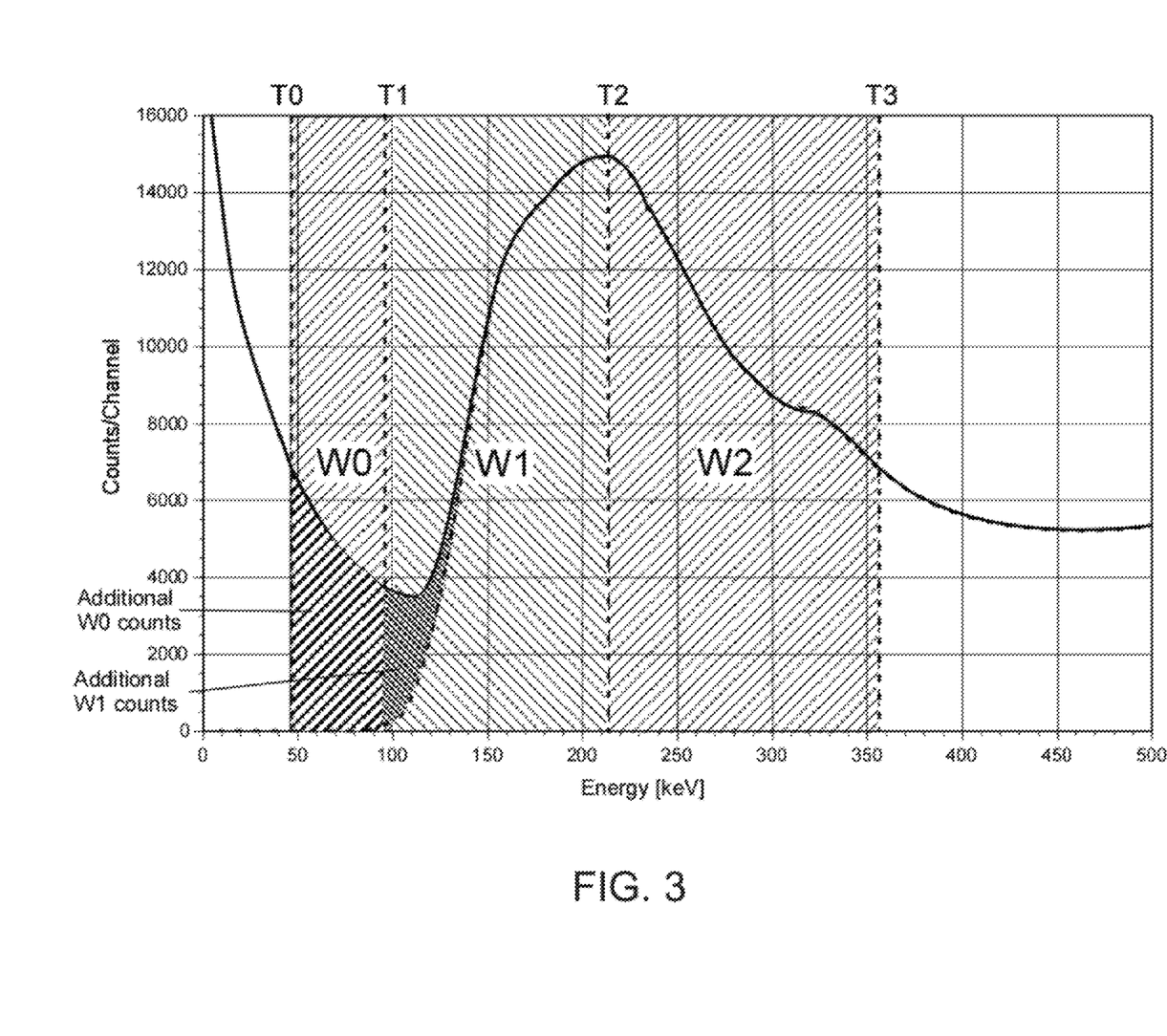
FIG. 3 is a graph of energy vs. counts illustrating energy thresholds used by the method of the present disclosure by which the gain regulation of the radiation detection system of FIG. 1 is stabilized and by which the accuracy of the radiation detection system of FIG. 1 is increased.

The use of additional thresholds and, in some cases, the choice of appropriate time windows with respect to the emission of neutrons from a pulsed neutron source by the gamma ray detection system 100 of the present disclosure addresses some of the above drawbacks. As shown in FIG. 3, the gamma ray detection system 100 includes an additional threshold, T0, thus creating another window or energy interval W0 between T0 and T1. The controller 112 thus determines a first count of gamma rays having an energy in the W0 interval, determines a second count of gamma rays having an energy in the W1 interval, and determines a third count of gamma rays having an energy in the W2 interval. In a pulsed neutron system, the time window for noise detection may be chosen as the time interval, during which the gamma ray count rate is the lowest, thus increasing the sensitivity to the detection of noise.

The controller 112 performs gain regulation, as described generally above, by adjusting the gain of the system such that the ratio between W1 and W2 is equal to a desired value. The error signal, used to set the gain, may be written as:

$$FF = \frac{a_1 \cdot W1 - a_2 \cdot W2}{a_1 \cdot W1 + a_2 \cdot W2}$$

where $a_1$ and $a_2$ are coefficients. The values a1 and a2 are determined experimentally, starting by acquiring spectra with a gamma ray detector, and then adjusting the gain of the gamma ray detector such that the backscatter peak (or other spectral feature such as the gamma ray peak from the decay of potassium-40) is in a desired channel. Thereafter, the channel boundaries for T1, T2, and T3 are determined, as well as the ratio between W1 and W2. From the ratio of W1 and W2, the ratio of $a_1$ and $a_2$ may be determined. The inventor has found a ratio of $a_1$ to $a_2$ of between 0.5 and 2 to be particularly useful, and that $a_1$ may be 9 and $a_2$ may be 10 in some applications.

The values of $a_1$ and $a_2$ may be adjusted if the spectrum between T1 and T3 changes shape due to materials in the borehole, such as barite mud, which may reduce the counts in W1 more than in W2. In logging while drilling tools, and to a lesser extent wireline tools, the values of $a_1$ and $a_2$ may be recalculated and changed if the collar (housing in a wireline tool) is changed yet the gamma ray detector remains the same. In addition, it should be appreciated that the error signal may be computed differently using different equations.

If using the equation given above, the gain regulation system aims to adjust the system gain such that FF=0 on average. To adjust the gain, the high voltage (HV) power supply 114, coupled between the controller 112 and the PMT 106, may be adjusted. Alternatively, the gain of the amplifier 108 could be adjusted, so as to achieve the same gain regulation.

In some applications, it may not be possible or desirable to adjust the HV power supply 114 or the amplifier 108. If the gain falls and is not readjusted, the thresholds of the windows correspond to higher energy values, reducing the accuracy of the system. In this case, the thresholds of the windows themselves can be adjusted so as to provide thresholds at the correct energies.

One way to adjust the gain by adjusting the high voltage power supply 114 may be written as:

$$\Delta HV = c_1 \cdot FF$$

where $c_1$ is a positive constant which has been determined experimentally. This means that if the counts in W1 are high, FF is positive and the high voltage is increased to move more of the peak into W2 and vice-versa. $c_1$ may be determined by varying the HV over a wide range, while the change in FF as a function of the HV is determined. The derivative of the resulting function can be used as $c_1$, although a value of $c_1$ less than the determined value may be used to help increase stability of the gain regulation.

Figure 4:
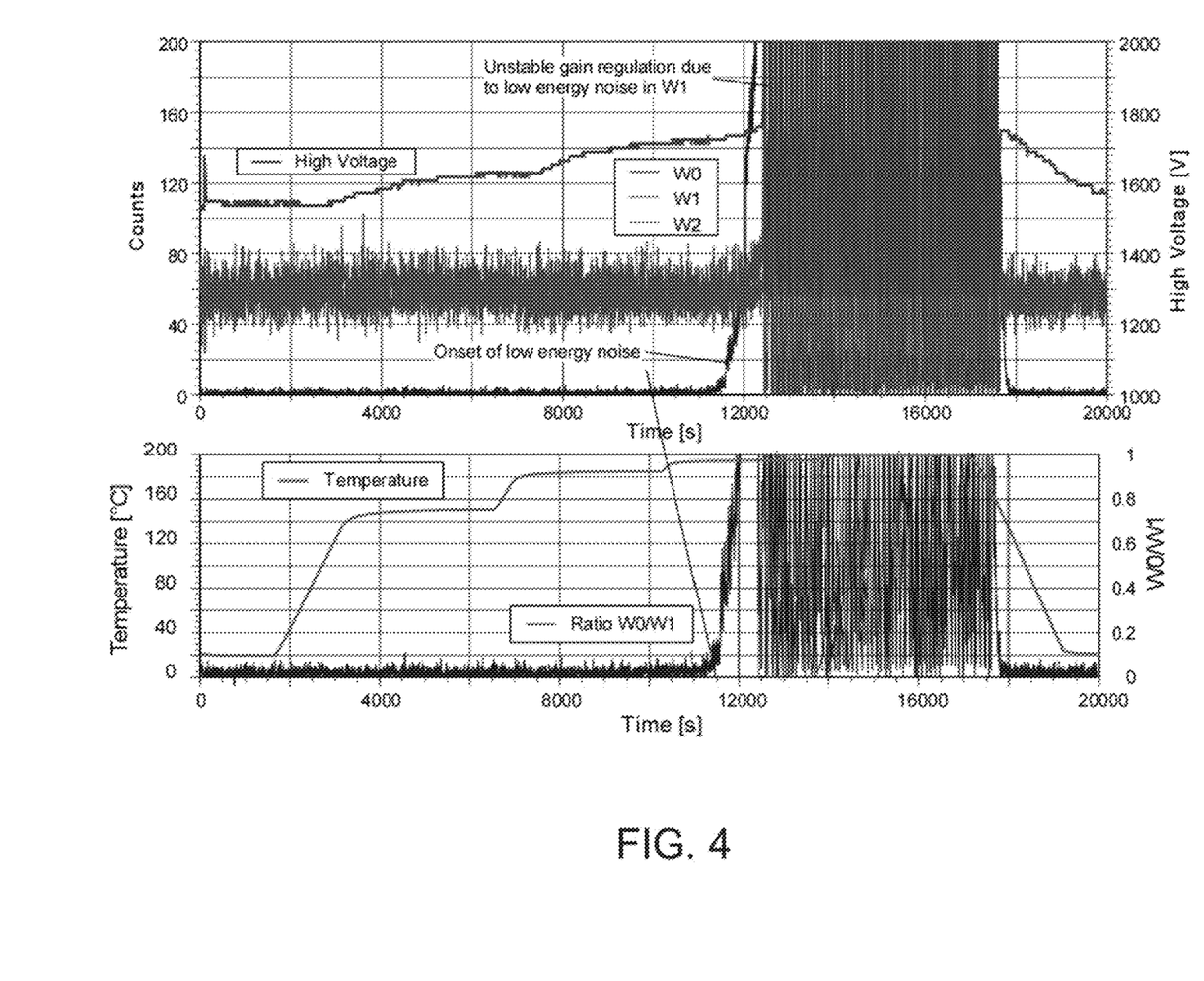
FIG. 4 includes graphs of time vs. counts and time vs. temperature illustrating gain destabilization of prior radiation detection systems due to noise.
Figure 5:
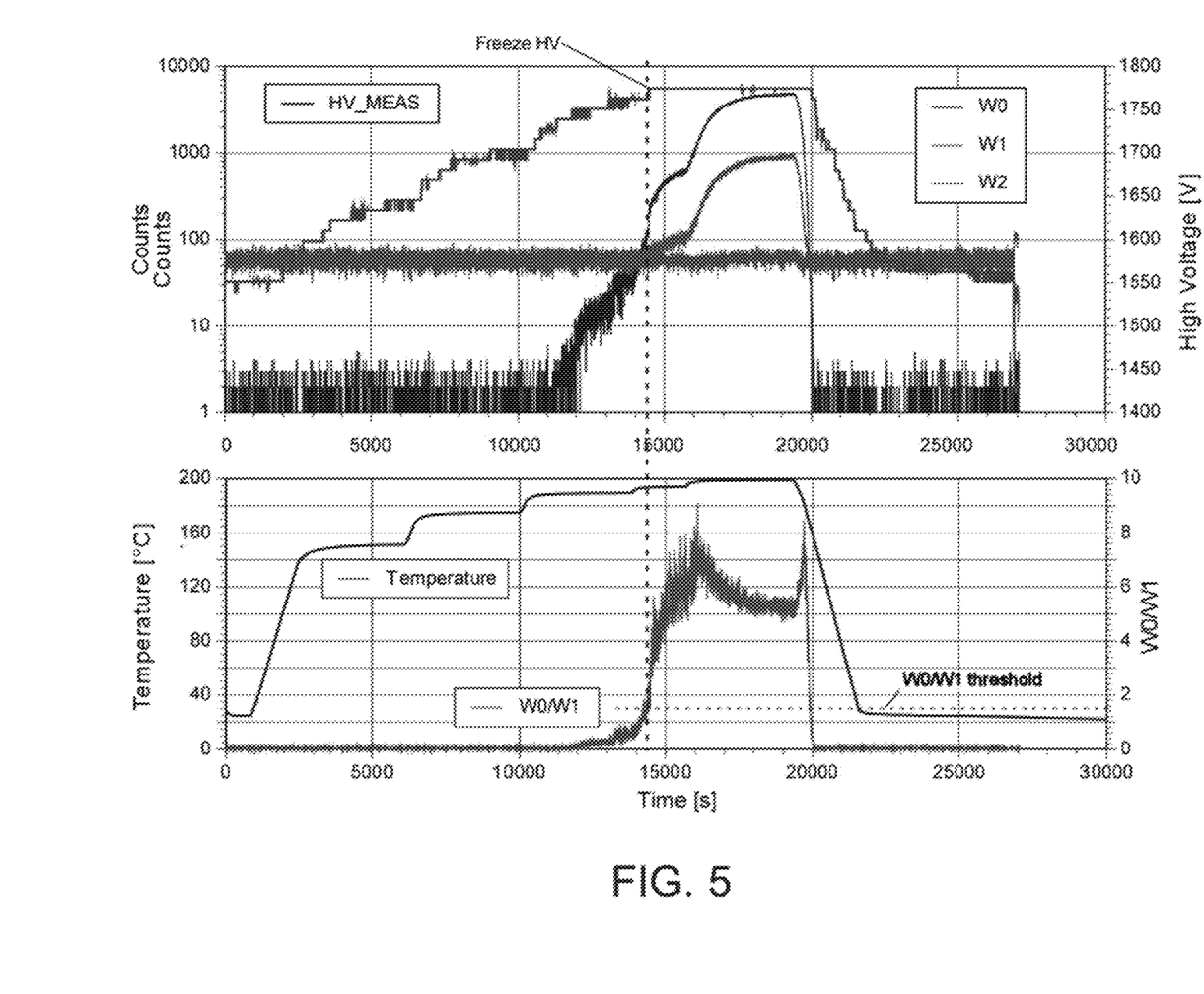
FIG. 5 includes graphs of time vs. counts and time vs. temperature illustrating results of the method of the present disclosure.

While performing this gain regulation, however, the controller 112 also monitors the ratio of W0 and W1. In the absence of noise, the ratio of W0 counts to W1 counts is low. However, in the presence of noise due to high temperature, the ratio of W0 counts to W1 counts increases. Such a situation is shown in FIG. 3, where the counts from noise have entered W0 and also W1, and thus the ratio of W0 counts to W1 counts has increased. Over time, this may result in destabilization of the gain control and runaway, as shown in FIG. 4, where as the temperature increases above 190° C., additional counts appear in W0, and then as the temperature keeps rising, additional counts appear in W1. Once additional counts appear in W1, the gain regulation attempts to compensate (incorrectly) by increasing the high voltage in an attempt to achieve the correct ratio between the W1 and W2 count rates. The lower graph in FIG. 5 shows the increase in the ratio between the counts in W0 and W1. Before the onset of noise the ratio is close to 0.0 and then starts increasing as the W0 counts increase.

To prevent this situation, the controller 112 suspends gain regulation, freezing it at the current level, if it detects that the ratio of W0 and W1 increases beyond a certain threshold. This threshold may be set such that the gain regulation is suspended before high temperature induced noise counts appear in W1. Also, in some applications, the controller 112 may force a decrease in the gain prior to or after suspending gain regulation.

The controller 112 then continues monitoring the ratio of W0 and W1, and restarts gain regulation when the ratio drops below a certain threshold. This threshold at which gain regulation restarts may be lower than the threshold at which gain regulation stops so as to prevent excessive activating and deactivating of the gain regulation.

Figure 6:
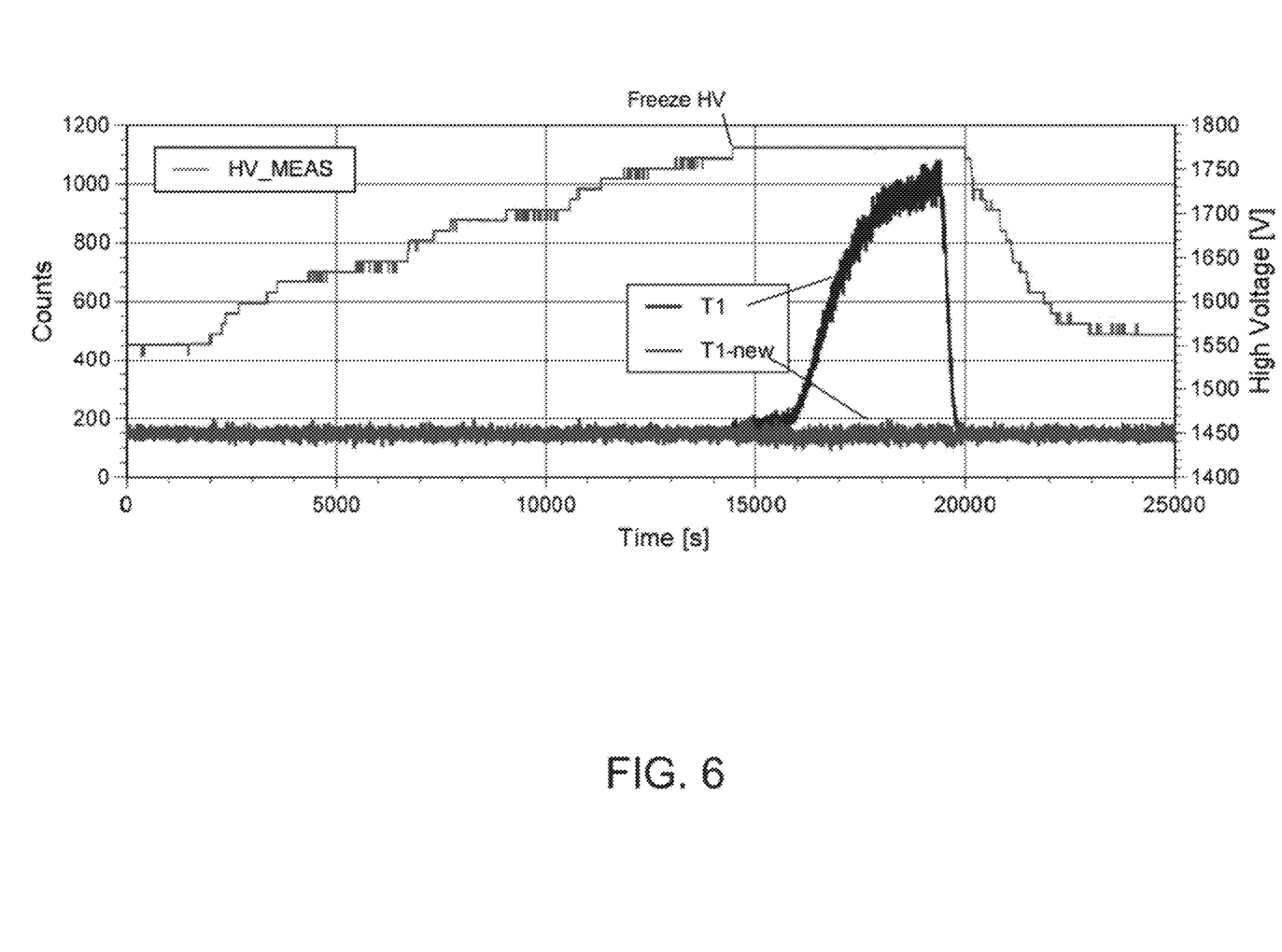
FIG. 6 is a graph of time vs. counts illustrating compensated total count results as given by the method of the present disclosure.

While ceasing gain regulation helps to improve performance of the radiation detection system 100, W1 and T1 counts may still increase as the temperature goes up. To determine a more accurate total gamma ray count, the W1 and T1 counts may be reconstructed using the T2 and W2 count rates, which are not affected by the noise. The results of this reconstruction are shown in FIG. 6. W1 and T1 are reconstructed as:

$$W1 = \frac{a_2}{a_1} W2$$

and $$T1 = W1 + T2 = \frac{a_2}{a_1} W2 + T2$$

While this revised computation increases the statistical error, it offers an accurate total gamma ray count at higher temperature in the presence of temperature induced noise.

The methods described above can also be used to detect and suppress counts caused by shock induced noise. Shock induced noise can have multiple causes. The principal cause is the momentary decoupling of the scintillator 104 and the photomultiplier tube 106 due to shock. Such decoupling can cause the emission of light. In addition, the scintillator 104 itself can emit shock induced light when subjected to mechanical stresses. Shock may also induce electronic noise through movement of wires or electrodes. Typically, this kind of noise provides mainly counts with small amplitudes (low apparent gamma ray energy). It is therefore possible to apply the same approach as used above to the suppression of shock induced noise and to prevent a potential destabilization of the gain loop.

In addition to, or instead of, the detection by the controller 112 of an increase in the ratio of W0 and W1 as described above, in this application, the shock induced counts can also be detected as a sharp momentary rise in the W1 and/or W0 counts. The controller 112 can then suspend gain regulation based upon the ratio of W0 and W1 exceeding a threshold amount, or based upon the sharp momentary rise in W1 and/or W0 counts, and can later restart gain regulation based upon the ratio falling below a threshold, or if a suitable time interval passes in which there are not addition incidences of excessive counts. The reconstructed W1 and T1 counts can be calculated as above.

While the operation of the controller 112 has been described as using a gain regulation based on W1 and W2, more complex regulation schemes that may or may not use the low energy part of the spectrum can be used. If the gain regulation is based on higher energy parts of the spectrum, it may not be helpful to freeze the gain regulation. In this case, the ratio of W1 and W2 can be determined before the onset of low energy noise is found in W1 and the stored ratio can be used to make a correction as indicated below:

$$\alpha_{nonoise} = \frac{W1_{nonoise}}{W2_{nonoise}}$$

and $$T1 = W1 + T2 = \alpha_{nonoise} \cdot W2 + T2$$

Figure 7:
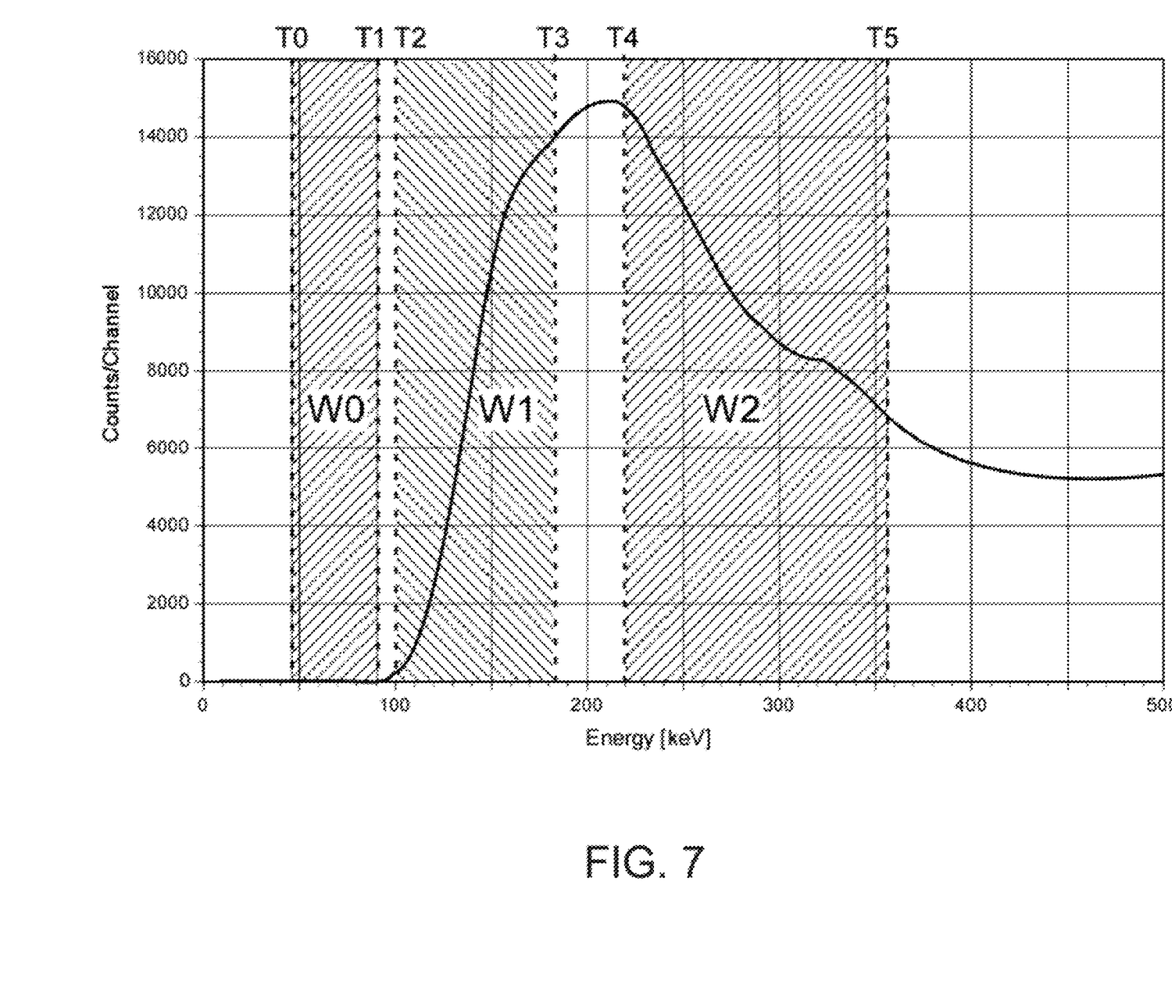
FIG. 7 is a graph of energy vs. counts illustrating energy thresholds used by the method of the present disclosure by which the gain regulation of the radiation detection system of FIG. 1 is stabilized and by which the accuracy of the radiation detection system of FIG. 1 is increased.

While the foregoing methods have been described in terms of the natural gamma ray measurement, they are not limited to such measurements. The methods apply equally to the measurement of gamma-rays from radioactive tracers, from radioactive isotopes created by neutron interactions, as well as to capture and inelastic gamma rays. In addition, while the gain regulation and count correction techniques above have been described using contiguous energy windows, the windows may also be non-contiguous windows defined by more thresholds as shown in FIG. 7, or may even be overlapping.

In yet another embodiment, in which spectral information is acquired in a multichannel spectrum, the known shape of the backscatter peak can be used to reconstruct the number of counts in the low energy region based on the difference between the expected shape of the backscatter peak and the observed shape, where the expected shape is computed based on the observed shape in the window between the second and third threshold.

In yet another approach, adjustment for a change in gain of the system can be made by changing the threshold values in proportion to the gain change. I.e. if the gain of the system falls by 10%, the respective values of the thresholds are changed by 10% each. This approach may be used if a single HV supply is used to power more than one detector and thus an accurate adjustment of gain is not possible by varying the high voltage.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. A method of detecting gamma rays using a gamma ray detector comprising:
    determining a first count of gamma rays having an energy in a first energy interval, using a controller coupled to the gamma ray detector;
    determining a second count of gamma rays having an energy in a second energy interval, the second energy interval having a higher energy than the first energy interval, using the controller;
    determining a third count of gamma rays having an energy in a third energy interval, the third energy interval having a higher energy than the second energy interval, using the controller;
    compensating the second count of gamma rays for noise based upon a ratio of the second count and the third count, using the controller;
    adjusting a system gain of the gamma ray detection system such that the ratio of the second count and the third count is constant in an absence of noise in the first energy interval; and
    detecting noise in the first energy interval based upon a ratio of the first count to the second count exceeding a given ratio, and ceasing system gain adjustment based thereupon.

2. A method as in claim 1, wherein the gamma ray detector is configured to detect a gamma ray spectrum; wherein the gamma ray spectrum has a backscatter peak; and wherein the second and third intervals are on opposite sides of the backscatter peak.

3. A method as in claim 1, further comprising adjusting the system gain so as to match the ratio of the second count and the third count to a borehole environment.

4. A method as in claim 1, further comprising decreasing the system gain after ceasing the system gain adjustment based upon detecting the noise in the first energy interval.

5. A method as in claim 1, further comprising resuming system gain adjustment based upon the ratio of the first count to the second count falling below a given ratio.

6. A method as in claim 1, wherein the first, second, and third energy intervals are contiguous.

7. A method as in claim 1, wherein the first, second, and third energy intervals are not contiguous.

8. A method as in claim 1, wherein the noise comprises temperature induced noise.

9. A method as in claim 1, wherein the noises comprises shock induced noise.

10. A method of measuring a spectrum of gamma rays in a borehole comprising:
    detecting a gamma ray spectrum using a gamma ray detector positioned in the borehole;
    determining a first count of gamma rays having an energy in a first energy interval, using a controller coupled to the gamma ray detector;

determining a second count of gamma rays having an energy in a second energy interval, the second energy interval having a higher energy than the first energy interval, using the controller;

determining a third count of gamma rays having an energy in a third energy interval, the third energy interval having a higher energy than the second energy interval, using the controller;

adjusting a system gain such that a ratio of the second count and the third count is constant in an absence of noise in the first energy interval; and detecting noise in the first energy interval based upon a ratio of the first count to the second count exceeding a given ratio, and ceasing system gain adjustment based thereupon.

11. A method as in claim 10, further comprising decreasing the system gain after ceasing the system gain adjustment based upon detecting the noise in the first energy interval.

12. A method as in claim 10, further comprising resuming system gain adjustment based upon the ratio of the first count to the second count falling below a given ratio.

13. A method as in claim 10, further comprising compensating the second count of gamma rays for the noise based upon the known ratio of the second count and the third count as $$W1 = \frac{a_2}{a_1} W2.$$

14. A method as in claim 7, wherein the gamma ray spectrum has a backscatter peak;
and wherein the second and third intervals are on opposite sides of the backscatter peak.

15. A method of detecting gamma rays using a gamma ray detector comprising:
determining an absence of noise in a first energy interval, using a controller coupled to the gamma ray detector;
in the absence of noise in the first energy interval, determining a second noise free count of gamma rays having an energy in a second energy interval, the second energy interval having a higher energy than the first energy interval, using the controller;
in the absence of noise in the first energy interval, determining a third noise free count of gamma rays having an energy in a third energy interval, the third energy interval having a higher energy than the second energy interval, using the controller;
determining a presence of noise in the first energy interval, using the controller;
in the presence of noise in the first energy interval, determining a second count of gamma rays having an energy in the second energy interval, using the controller;
in the presence of noise in the first energy interval, determining a third count of gamma rays having an energy in the third energy interval, using the controller; and
compensating the second count for noise in the second energy interval based upon a ratio of the second noise free count to the third noise free count, and based upon the third count obtained in the presence of noise.

16. A method as in claim 15, further comprising adjusting a system gain via a gain regulation scheme not based upon a ratio of the second noise free count to the third noise free count, and not based upon a ratio of the second count to the third count.

17. A method as in claim 15, wherein the absence of noise in the first energy interval is determined by determining a first count of gamma rays having an energy in the first energy interval, determining a second count of gamma rays having an energy in the second energy interval, and determining that the ratio of the first count to the second count does not exceed a given ratio.

18. A method as in claim 15, wherein the presence of noise in the first energy interval is determined by determining a first count of gamma rays having an energy in the first energy interval, determining a second count of gamma rays having an energy in the second energy interval, and determining that the ratio of the first count to the second count exceeds a given ratio.

19. A radiation detection system comprising:
a radiation detector;
a controller coupled to the radiation detector and configured to
determine a first count of radiation having an energy in a first energy interval,
determine a second count of radiation having an energy in a second energy interval, the second energy interval having a higher energy than the first energy interval,
determine a third count of radiation having an energy in a third energy interval, the third energy interval having a higher energy than the second energy interval, and
compensate the second count of radiation for noise based upon a ratio of the second count and the third count,
adjust a system gain of the radiation detection system such that the ratio of the second count and the third count is constant in an absence of noise in the first energy interval, and
detect noise in the first energy interval based upon a ratio of the first count to the second count exceeding a given ratio, and to cease system gain adjustment based thereupon.

20. A radiation detection system as in claim 19, wherein the radiation detector is configured to detect a radiation spectrum; wherein the radiation spectrum has a backscatter peak; and wherein the second and third intervals are on opposite sides of the backscatter peak.

21. A radiation detection system as in claim 19, wherein the controller is further configured to decrease the system gain prior to ceasing the system gain adjustment based upon detecting the noise in the first energy interval.

22. A radiation detection system as in claim 21, wherein the controller is further configured to resume system gain adjustment based upon the ratio of the first count to the second count falling below the given ratio.

23. A radiation detection system as in claim 19, wherein the first, second, and third energy intervals are contiguous.

24. A radiation detection system as in claim 19, wherein the first, second, and third energy intervals are not contiguous.

25. A radiation detection system as in claim 19, wherein the noise comprises a dark current of the radiation detector.

26. A radiation detection system as in claim 19, wherein the noise comprises shock induced noise of the radiation detector.

27. A radiation detection system as in claim 19, wherein the radiation detector comprises a scintillator optically coupled to a photomultiplier tube; and wherein the noise comprises a momentary decoupling of the scintillator and the photomultiplier tube due to shock.

* * * * *